United States Patent [19]

Horner

[11] 4,323,138
[45] Apr. 6, 1982

[54] AUTOMOTIVE LOUD SPEAKER ENCLOSURE

[75] Inventor: Larry D. Horner, Houston, Tex.
[73] Assignee: Horner Industries, Houston, Tex.
[21] Appl. No.: 146,256
[22] Filed: May 5, 1980
[51] Int. Cl.$^3$ .............................................. H05K 5/00
[52] U.S. Cl. ................... 181/147; 181/150; 181/153
[58] Field of Search ................. 181/144, 146–147, 181/148, 150, 152–154, 199, 159, 192, 195; 179/1 VE, 146 E; 312/242

[56] References Cited

U.S. PATENT DOCUMENTS 3,512,606  5/1970  Anastin ........................ 181/144
4,143,249  3/1979  Cinquino ..................... 312/242 X Primary Examiner—Hix. L. T.
Assistant Examiner—Thomas H. Tarcza
Attorney, Agent, or Firm—Gunn, Lee & Jackson

[57] ABSTRACT

A loud speaker enclosure is disclosed in the preferred and illustrated embodiment. In this form, the upper end of the loud speaker enclosure is shaped in the form of an oval having a relatively narrow opening in one dimension which opening is relatively long in the other dimension. It is surrounded by an encircling shoulder which serves as a mounting plate. The housing flares downwardly and to a larger diameter matching that of a circle so that it can be connected to a speaker. Preferably, the circular end of the housing connects with the outer rim of a bass speaker. The shoulder at the oval end supports a tweeter. The shoulder is connected to the nether side of a package shelf, and the housing extends below the package shelf where greater room is obtained, enabling the larger woofer to be mounted with greater space for it.

8 Claims, 2 Drawing Figures

AUTOMOTIVE LOUD SPEAKER ENCLOSURE

BACKGROUND OF THE DISCLOSURE

In automotive radio systems, stereo speakers are normally mounted on the rear package shelf. The term, "package shelf," refers to that generally flat space immediately in front of the back glass and to the rear of the back seat. In large size cars, this shelf is fairly wide. It can be easily as wide as two feet in some models. In some models, it is relatively narrow, even in the range of only 4.0 or 5.0 inches. With smaller size vehicles, the package shelf is made more narrow, and this width is sacrificed to reduce the size of the car.

The width of the package shelf is a limiting factor on the size of the speakers which are mounted on it. Typically, speakers have been mounted heretofore by cutting a hole in the package shelf and bolting the speaker in the hole. A popular size of automotive speakers is 6.0 inches by 9.0 inches, and this size typically requires a package shelf about 7.0 or 8.0 inches in width to accommodate the 6.0-inch dimension.

Speaker performance is dependent in part on the dimensions of the speaker. A woofer gives good performance, but it ordinarily requires a relatively large diameter speaker cone. The optimum woofer is round and 10.0 inches or larger in diameter. A 6.0"-by-9.0" woofer provides passable sound. The 6.0"-by-9.0" is probably the limit in speaker performance insofar as directly mounted speakers are concerned. A longer, thinner speaker, perhaps 4.0 inches by 10.0 inches, can be installed, but it no longer really functions as a woofer because the narrow dimension of the oval limits the speaker cone and makes it perform more as a high frequency speaker, not a low frequency speaker. Thus, while it is possible to fabricate a speaker that is quite narrow in one dimension, it is not desirable from a performance point of view.

The present invention enables a high performance speaker system to be installed in an automobile, even though the automobile has a very narrow package shelf. Moreover, it permits installation of more than one speaker, namely, a large woofer and a small tweeter. Indeed, a third speaker, typically known as a mid range speaker, can also be installed if it is coaxially mounted above the woofer. The structure of this apparatus includes a speaker enclosure which is constructed of a hollow housing shaped at one end to form a circle to enable it to be mounted to a woofer of substantial size, such as a 10.0-inch or larger woofer speaker. The optimum woofer is circular, and, accordingly, this end of the enclosure is circular. The woofer is equipped with a stiff ring around the maximum diameter thereof, and the enclosure housing connects to the ring. The opposite end of the enclosure is constructed in the form of an oval. It has a surrounding shoulder for connection to the package shelf, and the oval opening has a minor dimension and major dimension which enable an elongate, oval opening to be cut in the package shelf. The width of the opening is determined by the maximum width permitted on the package shelf, while the length of the opening approximates the diameter of the woofer. The speaker enclosure, itself, is a hollow enclosure of rigid reflective material substantially free of internal obstructions which flares along its length in transition between the two end shapes specified. At the oval end, it also has room to support a relatively small tweeter centrally axially mounted in the oval opening.

BRIEF DESCRIPTION OF THE DRAWINGS

So that the manner in which the above recited features, advantages and objects of the invention, as well as others which will become apparent, are attained and can be understood in detail, a more particular description of the invention briefly summarized above may be had by reference to the embodiments thereof illustrated in the appended drawings, which drawings form a part of this specification. It is to be noted, however, that the appended drawings illustrate only typical embodiments of the invention and are not to be considered limiting of its scope, for the invention may admit to other equally effective embodiments.

DETAILED DESCRIPTION OF THE ILLUSTRATED EMBODIMENT

Figure 1:
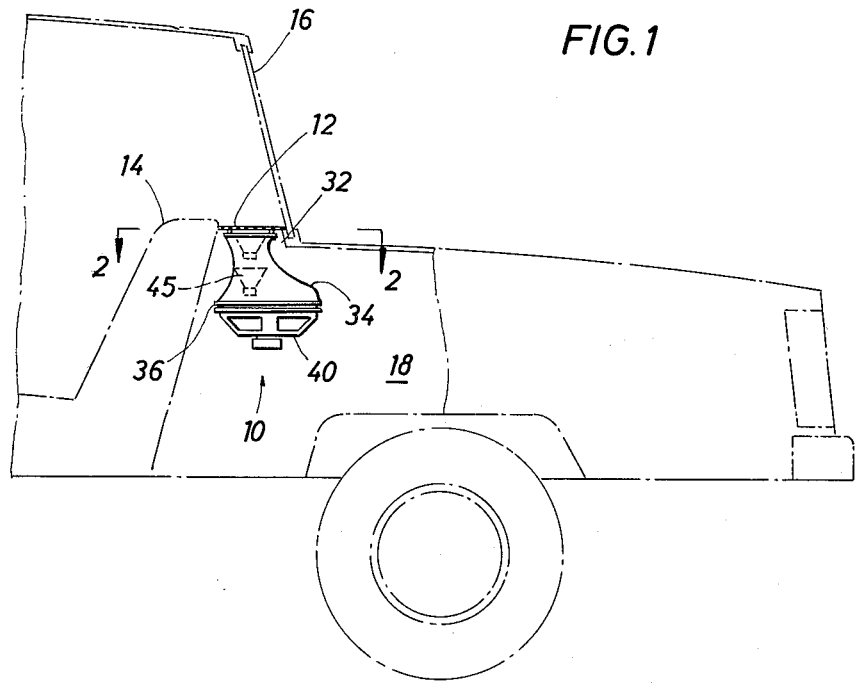
FIG. 1 shows the speaker enclosure of the present invention installed in an automobile.

In FIG. 1 of the drawings, the present invention is shown installed in an automobile. The installation contemplated by this apparatus is immediately adjacent to and attached at an opening formed in the package shelf. The opening may be cut in the package shelf at the time of installation, or it may be an existing, precut opening. The apparatus of the present invention is thus identified by the numeral 10 attached to a package shelf 12. The package shelf is located to the rear of the back seat 14 in the automobile. It is immediately forward of the back glass 16. The automobile incorporates a trunk area 18 which is a volume of space within the trunk. The trunk area 18 is to the rear of seat 14 and beneath the package shelf 12. In the particulars mentioned, the automobile is of typical or conventional construction, and the components of it are configured in the ordinary manner.

Figure 2:
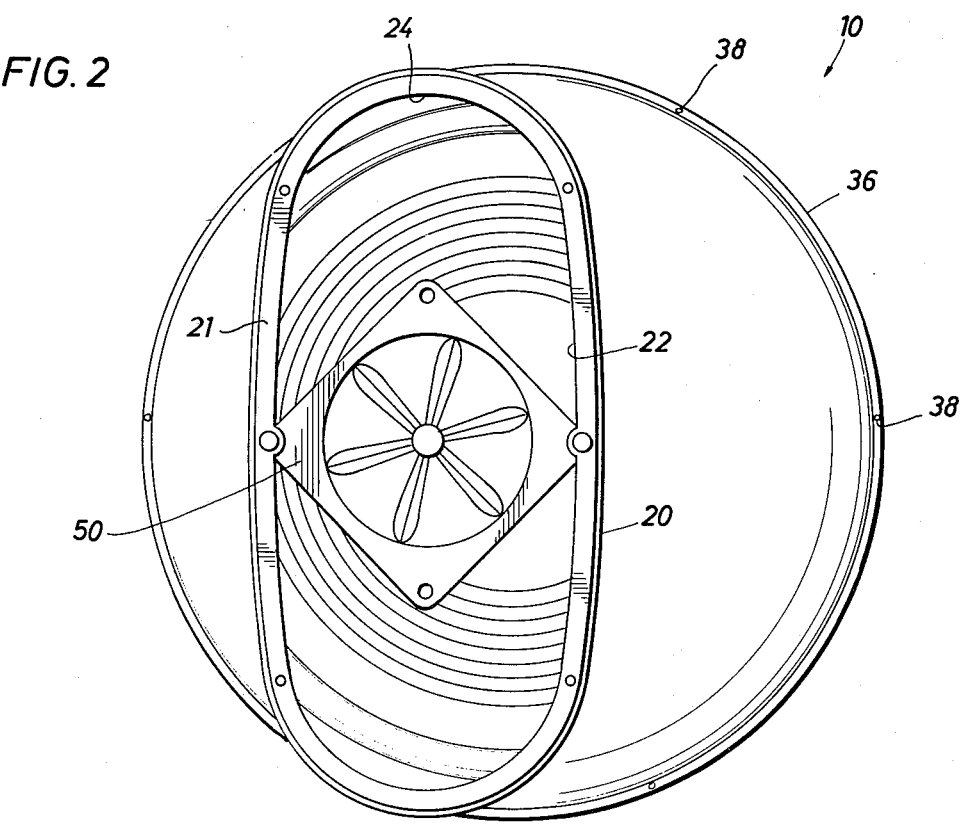
FIG. 2 is a top or plan view of the apparatus shown in FIG. 1, showing details of construction of one end of the speaker enclosure.

Attention is next directed to FIG. 2 of the drawings, where the speaker system of the present disclosure is illustrated in larger scale. It will be described referring to FIG. 2, and, thereafter, its installation in the automobile of FIG. 1 will be described. A single speaker system can be installed, or, in the alternative, two can be installed to provide stereo sound reproduction in the automobile.

This apparatus utilizes a shoulder at 20 which is a surrounding, peripheral lip for ease of connection and installation. The lip 20 fully surrounds an oval opening which is narrow in the middle and has a relatively long dimension. The narrow dimension is perhaps in the range of 3.0 or 4.0 inches in opening width, and the shoulder is about one-quarter to one-half inch wider around the edge. These dimensions can be varied inasmuch as there are no severe criteria limiting these dimensions. The oval opening thus has a narrow width at 22 which refers to the smallest part of the opening and a relatively large width or opening at 24. The relative shape of the opening is an oval. So to speak, the end portions are curved, almost circular, and the side lengths are, as illustrated in FIG. 2, gently curved. They are surrounded by the peripheral shoulder 20 which is provided with holes 26 so that the speaker enclosure can be bolted or otherwise attached to the package shelf 12.

The shoulder 20 encircles the outer periphery of the oval opening and is adapted to receive a gasket 21 having the same profile as the shoulder 20. It will be appreciated that an opening must be cut in the package shelf. In the mounting shown in FIG. 1, the shoulder 20 is on the lower side of the package shelf adjacent to the hole which is cut in it. The gasket 21 is sandwiched between the lower side of the package shelf and the shoulder 20.

The present invention is formed with an elongate, axially open-shaped body made of fiberglass and plastic material. Other materials can be used, but the preferred construction is through the use of fiberglass and a suitable polyester resin which is used to form a composite skin which takes on the shape and profile illustrated. It will be observed that the housing extends below the shoulder 20. In FIG. 1, the numeral 32 identifies a portion of the housing which is more nearly vertical, but which therebelow flows outwardly to the portion 34. It will be observed that the housing gets larger as it approaches the bottom portions. To this end, the numeral 36 identifies the lower peripheral rim of the housing. This rim is preferably circular and has a thickened reinforcing shoulder on it. The shoulder is circular and is sized to match or mate with the outer shoulder of a conventional large speaker. Typically, a woofer is best chosen. The rim 36 matches the outer periphery of the woofer and enables connection of the two. The numeral 38 identifies mounting holes at various locations around the rim 36. Suitable screws positioned in the mounting holes can be used to connect and anchor the woofer speaker to the lower end of the housing. While screws can be used for attachment, it is not mandatory to use this method of connection, and alternate means may be used. It will be observed in FIG. 1 that the large speaker is attached directly to the rim 36. There is no gap between the two. Thus, the speaker cone works into the cavity within the housing.

The woofer speaker is identified by the numeral 40 in FIG. 1. The woofer thus determines the maximum diameter of the housing or enclosure.

Several factors should be noted about the present apparatus and, in particular, the enclosure or housing. The internal surface is made relatively smooth, typically the smoothness approximately that obtained from composite construction of fiberglass and a polyester or epoxy resin impregnated into the fiberglass. The fiberglass can be shaped into the desired form, typically having a relatively thin wall, thereby providing an impact-resistant, somewhat resilient structure. It serves somewhat as a funnel with the internal smooth wall so that the sound created by the woofer 40 is carried upwardly and flows out through the oval opening. This directs the sound upwardly and provides good acoustic coupling so that there is no loss of fidelity on installing the enclosure between the listener and the speaker 40.

The enclosure thus serves to funnel the bass frequencies upwardly and out through the opening. Mid range frequencies are obtained by mounting a mid range speaker 45 within the speaker enclosure 10 above the woofer 40. High frequencies are obtained by installing a tweeter 50 at the oval opening just below the shoulder 20. Since the frequencies are a good deal higher for a tweeter, its size is much less, and tweeters having dimensions as small as about 2.0 inches are quite acceptable. They function quite well, and, moreover, they do not block the oval opening to an extent to degrade the quality of sound passing through the oval opening. For purposes of definition, a tweeter is a speaker which handles frequencies in excess of 2000.0 hertz. A woofer is a speaker which handles frequencies below 500.0 hertz. A mid range speaker typically will overlap the woofer and tweeter ranges somewhat, one suitable mid range response being between 400.0 and 3000.0 hertz. The different frequencies are directed to the appropriate speaker by a crossover network (not shown in the drawings). The crossover network functions similar to a crossover network in a home stereo unit, channeling bass frequencies to the woofer speaker, mid range frequencies to the mid range speaker and high frequencies to the tweeter speaker.

The present apparatus is installed in the following manner. Access to the lower side of the package shelf 12 is obtained. A hole, if required, is cut in the package shelf approximating the size and shape of the oval opening of the speaker enclosure. The hole in the package shelf is slightly smaller than the oval opening so that the shoulder 20 engages the nether side of the package shelf. Metal screws or nuts and bolts are threaded through the holes 26 to anchor the speaker enclosure to the package shelf. The enclosure is installed with the woofer 40, the mid range speaker 45 and the tweeter 50 already mounted thereon. It is attached by any suitable means, such as mounting bolts. The top end of the enclosure can be covered with grill cloth or a speaker grill as desired. When employing a speaker grill as a cover, the holes 26 may be aligned with holes provided in the speaker grill for mounting the speaker enclosure and the grill to the package shelf.

The apparatus functions in the following manner. The woofer normally reproduces low frequency output which flows upwardly and out through the enclosure. Bass notes are reproduced with a high level of fidelity. It will be appreciated that the bass notes produced by the woofer are formed in advance of the speaker cone, and they are outwardly projected by action of the speaker cone. Moreover, the bass notes produced by the speaker flow through the opening with enhancement achieved from the cavity of space on the back side of the woofer 40, to wit, an infinite baffle.

While the foregoing is directed to the preferred embodiment of the present invention, other and further embodiments of the invention may be devised without departing from the basic concept thereof, and the scope thereof is determined by the claims which follow.

I claim:

1. For use in an automobile having a package shelf opening into the passenger compartment with a space below the package shelf, a loud speaker enclosure which comprises an axially open enclosure housing having an oval opening at one end with a mounting means located at that end to be mounted to a package shelf at an opening cut in the package shelf to match the oval opening thereat, and further wherein said housing includes an upper portion which tapers downward from said oval opening and a lower portion which flares to a generally circular, open end for receiving thereon a speaker having a diameter sufficiently large that it cannot be mounted directly at the package shelf and wherein said housing extends from said mounting means downwardly when installed below said package shelf to support a speaker which directs speaker-made sound through said housing and out through the oval opening at the package shelf.

2. The apparatus of claim 1 including means for mounting a tweeter speaker at the oval opening in said housing.

3. The apparatus of claim 2 including a peripheral rim on said housing at the lower end for mounting a woofer speaker thereto.

4. The apparatus of claim 3 wherein the lower end of said housing is circular and is formed with a peripheral rim thereon.

5. The apparatus of claim 3 wherein the upper end thereof includes an upwardly protruding shoulder which incorporates bolt holes therein for mounting to the package shelf.

6. The apparatus of claim 5 including a fiberglass and epoxy resin housing body.

7. The apparatus of claim 5 including a fiberglass and polyester resin housing body.

8. The apparatus of claim 3 including a mid range speaker mounted in said enclosure housing.

* * * * *